Nov. 3, 1953     J. A. PERRY     2,657,882
AIRFOIL SUPPORT STRUCTURE
Filed June 18, 1951
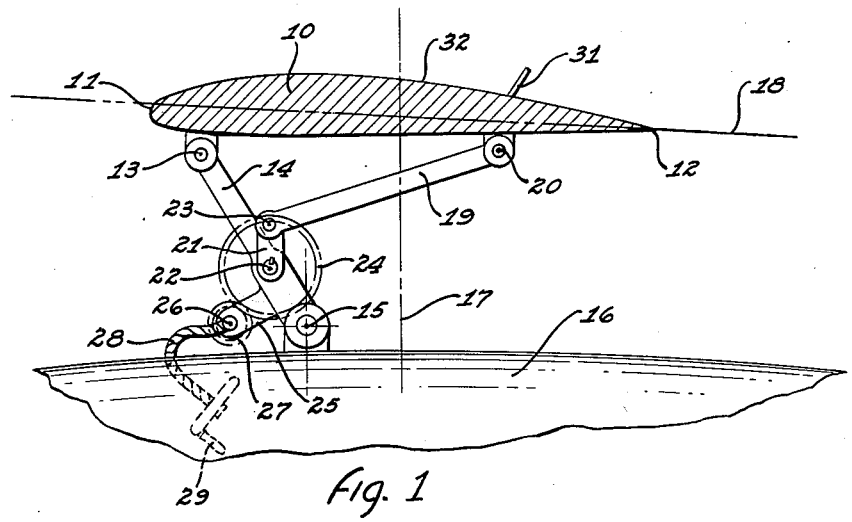
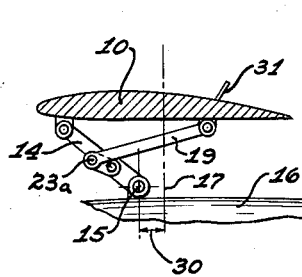
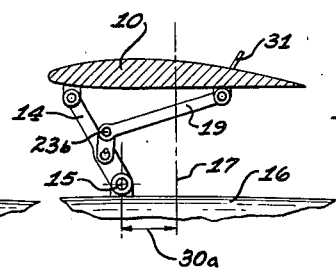
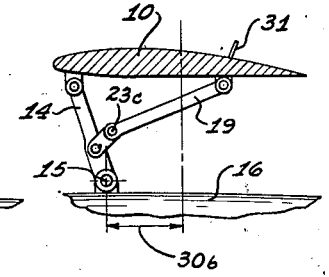
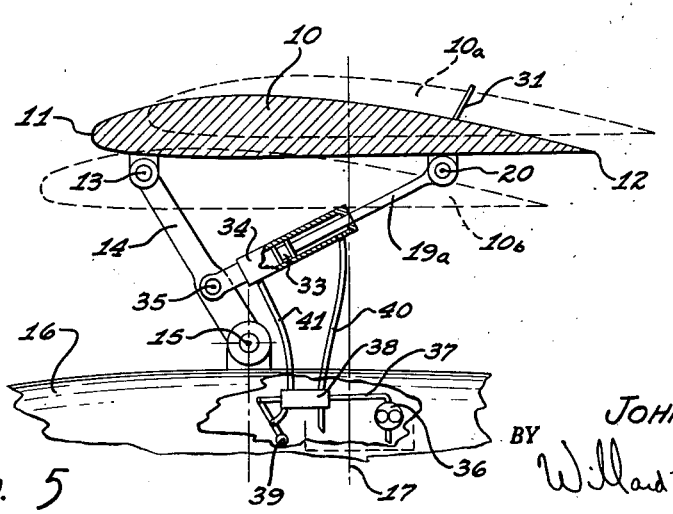
INVENTOR.
JOHN A. PERRY.
BY Willard S. Gove Patented Nov. 3, 1953

2,657,882

UNITED STATES PATENT OFFICE 2,657,882

AIRFOIL SUPPORT STRUCTURE

John A. Perry, Phoenix, Ariz.

Application June 18, 1951, Serial No. 232,126

6 Claims. (Cl. 244—48)

This invention pertains to improvements in airplane structures and is particularly directed to a novel adjustable pivotal mounting for airplane wing or air foil structures of aircraft.

One of the frequent causes of accidents in aircraft operations is that brought about by stalls in which the wings lose lifting power, the controls lose effectiveness and the nose drops causing the plane to fall rapidlly toward the ground usually terminating in a serious or fatal accident. This loss of lift which produces the stall is caused by an excessive angle of attack of the wing due to improper or inexperienced handling of the craft by the pilot. Frequently, under such conditions the inexperienced and perturbed pilot continues to hold back on the elevator control so that the wings will be forced to maintain an excessive angle of attack with reference to the downward glide path and the airplane will continue to fall until it strikes the ground. Excessive angle of attack is the only cause of such stalls due to improper handling of the plane, especially under emergency and unusual operating conditions which may be suddenly encountered by the pilot.

One of the objects of this invention is to provide an airplane wing support structure which automatically compensates or neutralizes the improper manipulation of the airplane so that the angle of attack of the wing is always maintained within predetermined close limits so that control and lift of the plane are maintained at all times.

Still another object of this invention is to provide a wing or airfoil supporting structure which is movably mounted relative to the fuselage or load carrying portion of the plane in such a manner that it automatically maintains the angle of attack within a predetermined range so that at no time does the craft lose lifting power and become uncontrollable.

Still another object of this invention is to provide an airplane wing support for an aircraft which is pivotally mounted about a horizontal transverse axis on the fuselage of the plane so as to allow it to adjust itself relative to the fuselage and maintain an angle of attack always below the stalling angle for the aircraft.

And a still further object of this invention is to provide an improved airplane wing structure pivotally mounted on the fuselage of an airplane and in which there are means for relatively adjusting the wing with regard to its pivotal mounting on the aircraft to facilitate proper trim and operating characteristics for the plane under varying conditions of flight and loading.

It is a further object of this invention to provide certain improvements and specific refinements in such airplane structures as set forth in applicant's co-pending patent application, Serial No. 201,378, filed December 18, 1950.

Further features and advantages of this invention will appear from a detailed description of the drawings in which:

Fig. 1 is an enlarged diagrammatic view of an airplane wing structure carried on a fuselage of an airplane incorporating the features of this invention.

Fig. 2 is a diagrammatic view showing one adjusted position of the wing relative to its mounting on the fuselage of the plane.

Fig. 3 is another view showing the wing adjusted to an intermediate position relative to its mounting on the fuselage of the airplane.

Fig. 4 shows still another view of the wing adjusted to its rear most position relative to its mounting on the fuselage of the plane.

Fig. 5 is an enlarged diagrammatic view showing the wing structure of Fig. 1 incorporating the novel features of this invention but controlled by fluid pressure actuating means.

Referring to Fig. 1 there is shown a typical airfoil section or wing structure 10 having the leading edge 11 and trailing edge 12. The wing is connected through a pivotal pin 13 with a supporting lever 14 in turn pivotally mounted at 15 on the fuselage 16 of the airplane. The pivot axis 15 is positioned at some point toward the leading edge of the wing relative to a vertical plane 17 perpendicular to the chord 18 of the wing and lying midway between the leading edge 11 and trailing edge 12 of the airfoil section 10.

In order that the airfoil 10 may as a whole be adjusted frontwardly or rearwardly relative to the fuselage 16 and the axis of pivoting 15 thereon there is provided a second link member 19 pivotally mounted at 20 toward the rearward portion or trailing edge of the wing. The other end of the link 19 may be adjusted relative to the pivot axis 15 and the arm 14 by any suitable pilot controlled and actuated mechanism such, for example, as the control crankshaft 21 journaled intermediate arm 14 for rotation about a suitable axis 22 on the arm 14. The crankshaft 21 has a crank pin 23 pivotally connected to said other end of the link 19 from the end of the link pivotal connection 20 with the wing. Any suitable mechanism may be utilized to rock the crankshaft 21 to the various positions shown in Figs. 2, 3 and 4 such as a gear 24 fixed to the main bearing portion defined by the axis of rotation 22 of the crankshaft. A supporting lug 25 carries an operating shaft 26 to which is suitably connected a pinion 27 which in turn is in mesh with the gear 24. A suitable flexible shaft connection or other equivalent means 28 actuated by a conveniently placed hand wheel 29 for operation by the pilot in the cockpit, may be used to rotate the pinion 27 and therefore the gear 24 to rock the crankshaft 21 about the main bearing axis 22.

In Figs. 2, 3 and 4 is shown the various positions to which the crankshaft 21 may be rotated. In Fig. 2 the crank pin 23 is rotated to its forward position 23a so as to draw the link 19 relatively forwardly to cause the pivot axis 15 of the wing mounting on the fuselage to move relatively to the vertical plane 17 so that the dimension 30 becomes relatively smaller and the wing as a whole is moved relatively forwardly of its pivotal mounting 15 on the fuselage of the plane. In Fig. 3 there is shown the intermediate position of rocking movement 23b of the crankshaft 21 in which case the pivot axis 15 and the vertical plane 17 are moved further apart as indicated by the dimension 30a so that the wing is relatively further back with regard to the pivot axis 15 on the fuselage than in Fig. 2. An extreme position of rearward positioning of the wing is that shown in Fig. 4 wherein the crankshaft is positioned at the point 23c so that the dimension 30b is at its maximum with the wing moved relatively far back toward the rear portion of the fuselage of the plane.

It is thus apparent that means has been provided for relatively shifting the pivotal connection at the point 15 of the airfoil 10 with the fuselage at any time including during flight. Thus in this manner the attitude of the airplane may be carefully adjusted to different types of operating conditions and different loading of the fuselage of the plane and thereby maintain a high degree of efficiency and control for the aircraft. It is further apparent that the wing structure 10 as a whole being pivotally mounted freely about the axis 15 can relatively adjust itself in swinging movement about said pivot axis 15 automatically and independently of pilot control to maintain a proper angle of attack with the flight path at all times without attention or skill upon the part of the pilot. It is to be further noted and understood that the usual aileron controls and other control members of the plane may be used in conjunction with this type of wing so as to direct and orient the plane in proper relationship to the desired direction of flight.

It is to be further noted that the wing as a whole will fluctuate and rock about the axis 15 under flight conditions within a narrow range of control so that it floats close to or approximately a few degrees of rocking movement in their stabilized or zero lift position. In order to prevent hunting or oscillating rocking motion about the pivot axis 15 there is provided a relatively small stabilizer tab or other restrictive projection 31 preferably fixed on the upper surface 32 of the airfoil and, as shown, toward the trailing edge 12 of the wing. This provides a small negative bias or drag on the wing to normally energize it during flight to a position of slightly increased angle of attack relative to zero angle of attack so that the wing will normally shift up close to the zero lift position and will maintain itself in stability in that position. This gives stability and causes the wing to shift smoothly from the positive to the negative position of lift without flutter or irregularity in movement as the craft picks up speed or as it slows down for landing purposes.

Fig. 5 illustrates another method of actuating the wing to readjust it relative to its pivot point 15 on the fuselage of the plane from that shown in Fig. 1. In this arrangement the airfoil 10 is pivotally mounted at 13 on the arm 14 which in turn is pivotally connected at 15 to the fuselage 16 of the plane. In place of the mechanically actuated connecting link 19 in Fig. 1, there is provided a piston rod 19a pivotally connected at 20 to the airfoil 10 which operates with its piston 33 in a cylinder 34 pivotally connected at 35 to the arm member 14. A suitable fluid pressure pump 36 is provided in the fuselage 16 of the plane which provides a source of fluid pressure in the output line 37 connected to the control valve 38 operated by a suitable control lever 39 by the pilot of the craft. Fluid pressure may be selectively applied by the valve 38 through the flexible conductor lines 40 and 41 so as to reciprocate the piston 33 in the cylinder 34 to position the airfoil section in any position between the range 10a and 10b for relatively positioning the pivot axis 15 with regard to the wing structure as shown in Fig. 2, 3 and 4.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an airfoil support structure, a fuselage, a supporting lever, a pivotal connection between said fuselage and one end of said supporting lever, an airfoil having a leading edge and a trailing edge, a pivotal connection located on said airfoil near the leading edge thereof connected to the other end of said supporting lever, a crankshaft having its main bearing axis journaled at an intermediate point on said supporting lever, a crankpin on said crankshaft, a link, a pivotal connection located on said airfoil toward the trailing edge thereof and connected to one end of said link, means for pivotally connecting the other end of said link to said crankpin, and means for rotating said crankshaft.

2. In an airfoil support structure, a fuselage, a supporting lever having an upper and lower end, a pivotal connection between said fuselage and the lower end of said supporting lever having a horizontal transverse axis of rocking movement on said fuselage, an airfoil having a leading edge and a trailing edge, a pivotal connection located on the underside of said airfoil near the leading edge of said airfoil connected to the upper end of said supporting lever with the axis of said pivotal connection between said airfoil and said supporting lever being parallel to the axis of said pivotal connection between said fuselage and said supporting lever, a crankshaft having its main bearing axis journaled parallel to axis of said pivotal connection between said fuselage and said supporting lever at an intermediate point on said supporting lever, a crankpin on said crankshaft, a link, a pivotal connection located with its axis parallel to pivotal connection on said fuselage on the underside of said airfoil toward the trailing edge thereof and connected to the upper end of said link, means for journalling the lower end of said link on said crankpin, and means for rotating said crankshaft.

3. In an airfoil support structure, a fuselage, a supporting lever, a pivotal connection between said fuselage and one end of said supporting lever, an airfoil having a leading edge and a trailing edge, a pivotal connection located on said airfoil near the leading edge thereof connected to the other end of said supporting lever, a crankshaft having its main bearing axis journaled at an intermediate point on said supporting lever, a crankpin on said crankshaft, a link, a pivotal connection located on said airfoil toward the trailing edge thereof and connected to one end of said link, means for pivotally connecting the other end of said link to said crankpin, means for rotating said crankshaft comprising a gear fixed to said crankshaft in its main bearing axis, an operating shaft journaled in said supporting lever, a pinion fixed on said operating shaft meshing with said gear, and means for rotating said operating shaft.

4. In an airfoil support structure, a fuselage, a supporting lever having an upper and lower end, a pivotal connection between said fuselage and the lower end of said supporting lever having a horizontal transverse axis of rocking movement on said fuselage, an airfoil having a leading edge and a trailing edge, a pivotal connection located on the underside of said airfoil near the leading edge of said airfoil connected to the upper end of said supporting lever with the axis of said pivotal connection between said airfoil and said supporting lever being parallel to the axis of said pivotal connection between said fuselage and said supporting lever, a crankshaft having its main bearing axis journaled parallel to axis of said pivotal connection between said fuselage and said supporting lever at an intermediate point on said supporting lever, a crankpin on said crankshaft, a link, a pivotal connection located with its axis parallel to pivotal connection on said fuselage on the underside of said airfoil toward the trailing edge thereof and connected to the upper end of said link, means for journalling the lower end of said link on said crankpin, means for rotating said crankshaft comprising a gear fixed to said crankshaft in its main bearing axis, an operating shaft journaled in said supporting lever, a pinion fixed on said operating shaft meshing with said gear, and means for rotating said operating shaft.

5. In an airfoil support structure, a fuselage, a supporting lever, a pivotal connection between said fuselage and one end of said supporting lever, an airfoil having a leading edge and a trailing edge, a pivotal connection located on said airfoil near the leading edge thereof connected to the other end of said supporting lever, a fluid pressure cylinder, a pivotal connection between said cylinder and an intermediate point on said supporting lever, a piston rod in said cylinder, a pivotal connection located on said airfoil toward the trailing edge thereof and connected to the outer end of said piston rod, and means for applying fluid pressure to said cylinder to reciprocate said piston rod in said cylinder.

6. In an airfoil support structure, a fuselage, a supporting lever, a pivotal connection between said fuselage and one end of said supporting lever, an airfoil having a leading edge and a trailing edge, a pivotal connection located on said airfoil near the leading edge thereof connected to the other end of said supporting lever, a link, a pivotal connection located on said airfoil toward the trailing edge of said airfoil and connected to one end of said link, an extendable and retractable actuator element located on an intermediate position of said supporting lever, and a means connecting said link to said actuator element.

JOHN A. PERRY.

References Cited in the file of this patent
UNITED STATES PATENTS

| Number | Name | Date |
|---|---|---|
| 1,351,918 | Lawrence | Sept. 7, 1920 |
| 1,742,082 | Keller | Dec. 31, 1929 |
| 2,160,089 | Schairer | May 30, 1939 |
| 2,428,194 | Bockrath | Sept. 30, 1947 |
| 2,541,922 | Hosford | Feb. 13, 1951 |
| 2,563,298 | Winslow | Aug. 7, 1951 |
| 2,601,962 | Douglas | July 1, 1952 |
| 2,623,712 | Spratt | Dec. 30, 1952 |

FOREIGN PATENTS

| Number | Country | Date |
|---|---|---|
| 10,257 | France | Mar. 11, 1909 |